(12) United States Patent
Le et al.

(10) Patent No.: US 9,469,798 B1
(45) Date of Patent: Oct. 18, 2016

(54) MINE SEAL

(71) Applicant: Line-X LLC, Huntsville, AL (US)

(72) Inventors: Dustin Le, Irvine, CA (US); Terry Pe, Madison, AL (US)

(73) Assignee: LINE-X LLC, Huntsville, AL (US)

( * ) Notice: Subject to any disclaimer, the term of this patent is extended or adjusted under 35 U.S.C. 154(b) by 231 days.

(21) Appl. No.: 14/096,340

(22) Filed: Dec. 4, 2013

Related U.S. Application Data (63) Continuation-in-part of application No. 14/022,128, filed on Sep. 9, 2013, now abandoned, which is a continuation of application No. 12/880,048, filed on Sep. 10, 2010, now abandoned.

(60) Provisional application No. 61/241,294, filed on Sep. 10, 2009.

(51) Int. Cl.
  *C09J 175/04* (2006.01)
  *E21D 9/14* (2006.01)

(52) U.S. Cl.
  CPC ............... *C09J 175/04* (2013.01); *E21D 9/14* (2013.01)

(58) Field of Classification Search
  CPC ............................. C09J 175/04; E21D 9/14
  See application file for complete search history.

(56) References Cited

U.S. PATENT DOCUMENTS

| | | |
|---|---|---|
| 4,324,080 A | 4/1982 | Mullins |
| 4,516,879 A | 5/1985 | Berry |
| 4,965,292 A | 10/1990 | Muller |
| 5,037,879 A | 8/1991 | Roberts |
| 5,385,504 A | 1/1995 | Hussey |
| 5,466,489 A | 11/1995 | Stahl |
| 5,525,663 A | 6/1996 | Oien |
| 5,560,736 A | 10/1996 | Mehesch |
| 5,646,230 A | 7/1997 | Pantone |
| 5,716,711 A | 2/1998 | Calder |
| 5,721,311 A | 2/1998 | Oien |
| 5,725,327 A | 3/1998 | Hussey |
| 5,753,747 A | 5/1998 | Oien |
| 5,938,375 A | 8/1999 | Wheeler, Jr. |
| 6,032,421 A | 3/2000 | Yamada |
| 6,223,475 B1 | 5/2001 | Hume |
| 6,419,324 B1 | 7/2002 | Kennedy |
| 6,639,010 B2 | 10/2003 | Bode |
| 6,664,316 B1 | 12/2003 | Hywel-Evans |
| 6,688,813 B2 | 2/2004 | Kennedy |
| 6,713,554 B2 | 3/2004 | Bode |
| 6,780,459 B2 | 8/2004 | Macpherson |
| 6,867,254 B2 | 3/2005 | Wiercinski |
| 6,966,610 B2 | 11/2005 | Mills |
| 7,011,865 B2 | 3/2006 | Sengupta |
| 7,144,937 B2 | 12/2006 | Klosowski |
| 7,290,960 B2 | 11/2007 | Sengupta |
| 7,381,768 B2 | 6/2008 | Wiercinski |
| 7,414,092 B2 | 8/2008 | Steidl |
| 7,422,791 B2 | 9/2008 | Klosowski |
| 2003/0022960 A1 | 1/2003 | Macpherson |
| 2004/0122145 A1 | 6/2004 | Klosowski |
| 2004/0175238 A1 | 9/2004 | Kennedy |
| 2005/0194752 A1 | 9/2005 | Klosowski |
| 2007/0101907 A1 | 5/2007 | Hellmann |
| 2008/0004395 A1 | 1/2008 | Covelli |
| 2008/0033080 A1 | 2/2008 | Mader |
| 2008/0161454 A1 | 7/2008 | Mader |
| 2008/0223519 A1 | 9/2008 | Locko |
| 2009/0010715 A1 | 1/2009 | Watson |
| 2009/0078433 A1 | 3/2009 | Hussey |
| 2009/0092811 A1 | 4/2009 | Chasser |
| 2009/0137699 A1 | 5/2009 | Mader |

FOREIGN PATENT DOCUMENTS

| | | |
|---|---|---|
| WO | 2008154361 | 12/2008 |
| WO | 2009097187 | 8/2009 |

OTHER PUBLICATIONS

Mine Safety and Health Administration Approval No. 50G-04.0, 50-psi Micon GOB-Isolation Hybrid Seal, Mine Installation Guidelines, Jun. 9, 2009.

Mine Safety and Health Administration Approval No. 120M-11.0, 120 psi Micon Main Line Hybrid II Seal, Mine Installation Guidelines, Dec. 7, 2009.

Mine Safety and Health Administration Approval No. 120M-06.1, 120 psi Micon Main Line Hybrid Seal, Mine Installation Guidelines, Mar. 2, 2009.

*Primary Examiner* — Patrick Niland (74) *Attorney, Agent, or Firm* — Benesch, Friedlander, Coplan & Aronoff LLP (57) ABSTRACT

A mine seal constructed from blocks adhered with a polyurea adhesive, the adhesive being formed by reacting a first prepolymer comprising an aromatic isocyanate with a second prepolymer comprising an aliphatic isocyanate, thereby forming an A-side mixture, and then reacting this mixture with a B-side mixture comprising an amine functional resin that includes a secondary amine.

20 Claims, 5 Drawing Sheets

MINE SEAL

The present application claims the benefit of priority under 35 U.S.C. §120 from the following U.S. patent applications: U.S. Provisional Patent Application No. 61/241,294, filed Sep. 10, 2009; U.S. patent application Ser. No. 12/880,048, filed Sep. 10, 2010; and Ser. No. 14/022,128, filed Sep. 9, 2013. The entire disclosures of the foregoing patent applications are hereby incorporated herein by reference in their entirety.

BACKGROUND

Mine shafts are created in the process of tunneling underground in order to extract mineral resources. Once a desired mineral resource has been extracted from a shaft, the shaft may no longer be used for further mining. Shafts are also sometimes abandoned for commercial reasons, such as when the company operating a mine ceases operations. Mine shafts which are no longer in use may be sealed for any of a number of reasons, for example to reduce subsidence or to reduce safety and health hazards caused by the emission of gases within a shaft.

Mine seals are generally required by regulations to meet certain standards of strength and resistance, in particular resistance to explosive force and static load. Under rules announced by the Mine Safety and Health Administration in 2008, new mine seals are required to withstand pressures of at least 50 pounds per square inch when the atmosphere inside a sealed area is monitored and maintained without explosive methane concentrations, while seals in areas that are not being monitored or maintained inert must withstand pressures of at least 120 pounds per square inch. In areas where explosive methane concentrations are likely or conditions such as bottom mining might increase blast forces, seals must be designed to withstand pressures of more than 120 pounds per square inch.

Current mine seals are generally formed by cementing concrete blocks in place to form a wall at the entrance to a shaft, a process that typically requires several days and involves transporting quantities of water and cement into a mine in order to create mortar on-site. While concrete blocks can generally resist upwards of 400 psi of compressive force, the mortar portion of the mine seal is less resistant. A need therefore exists for mine seals having improved structural properties which can be formed in the environment of an underground mine.

SUMMARY

The present invention comprises an improved mine seal capable of withstanding considerably greater force than existing mine seals. The present seals make use of novel polymer materials capable of resisting forces of greater than 400 psi which join blocks of concrete or other structure-forming materials in order to form a mine seal. Such polymer materials comprise castable polyurea polymers having a long pot life in the frequently moist conditions of an underground mine.

In one embodiment, the present invention comprises a process for preparing an adhesive composition for use in creating a mine seal. The process preferably comprises the step of preparing a first prepolymer by mixing an isocyanate having an NCO content of between 15% and 35%, more preferably between 17% and 18%, such as diphenylmethane diisocyanate (MDI), toluene diisocyanate (TDI), and/or hexamethylene diisocyanate (HDI) with a polyol. Preferably, the isocyanate of the first prepolymer has an NCO content of between 16% and 18%. In one embodiment, the first prepolymer comprises between 50% and 60% by weight MDI and between 40% and 50% by weight polyol.

Next, a second prepolymer is prepared by mixing the first prepolymer and an aliphatic isocyanate such as HDI, preferably forming a 50:50 mixture by weight. The aliphatic isocyanate of the second prepolymer preferably has an NCO content of between 8% and 24%, more preferably between 12% and 16%, and even more preferably either 14% or 15%. The second prepolymer is then mixed with providing an amine functional resin comprising a secondary amine in order to form a flowable adhesive composition. The amine functional resin preferably has an amine equivalent weight of between 200 and 350, and more preferably of about 300.

In a preferred embodiment, the amine functional resin is admixed with a water scavenger, preferably a molecular sieve. The molecular sieve preferably comprises between 0.1% and 5% by weight of the amine functional resin. Other components that can be provided in admixture with the amine functional resin include plasticizers and air release agents.

In another preferred embodiment, a colorant is added to either the second prepolymer or the amine functional resin, the other component preferably being colorless (clear). Such a colorant can provide a visual indicator of the proper admixture of the second prepolymer and the amine functional resin. The colorant can be any of a number of pigments or dyes, but is preferably an organic dye which is amino or hydroxy terminated. In another embodiment, a first colorant can be added to the second prepolymer and a second colorant can be added to the amine functional resin. The resulting colors of the second prepolymer and the amine functional resin should have wavelengths which differ by at least 20 nanometers.

The adhesive composition formed according to the present process preferably has a sheer strength of at least 350 psi and is used to adhere rigid blocks together in order to form an underground mine seal. Preferably, the blocks are porous such as concrete masonry unit blocks. In constructing the present mine seal, a polymer foam is preferably applied between the roof of the mine shaft and the upper surface of the wall of the mine seal, and between the sides of the wall and the respective vertical wall portions of the mine shaft. The polymer foam can be, for example, is a polyurethane foam having a density of at least 15 pounds per cubic inch. The adhesive composition is also preferably applied to the roof of the mine shaft, the upper surface of the wall of the mine seal, the vertical sides of the wall, and the respective vertical wall portions of the mine shaft before the polymer foam is applied.

DESCRIPTION

Definitions

As used herein, the following terms and variations thereof have the meanings given below, unless a different meaning is clearly intended by the context in which such term is used.

"Accumulator" refers to a pressure storage reservoir in which a non-compressible hydraulic fluid is held under pressure by an external source, such as a spring, a raised weight, or a compressed gas.

"Amine number" means the milligrams of KOH equivalent to the free amine groups in one gram of the resin, i.e. the ratio of the mass of potassium hydroxide which consumes as much acid on neutralization as does the sample being examined, to the mass of that sample (mass of the solid in the sample in the case of solutions or dispersions).

"Castable" refers to the ability of a polymer to be poured, such onto a surface or into a mold, and thus refers to a material which is flowable (able to spread over a surface) such as a liquid.

"Colorant" refers to a material which imparts a visually distinguishable color to another material.

"Dye" means a material, usually a liquid, which is soluble in a liquid vehicle and imparts color when dissolved in the liquid vehicle.

"Mine seal" means a physical barrier in an underground tunnel which contacts the walls, floor, and/or ceiling of the tunnel in order to prevent access to the tunnel, and which is able to withstand blast pressures of at least 20 psi, preferably 50 psi, and more preferably 120 psi or more. A mine seal also preferably forms a complete physical barrier preventing access to a tunnel or a portion thereof and limits or prevents the flow of gases from one side of the seal to the other side.

"Molecular sieve" refers to a material containing tiny pores of a precise and uniform size that is used as an adsorbent for gases and liquids, in particular in a polymer mixture.

"NCO content" refers to the mass of the NCO groups of a molecule as a percentage (weight percent) of the total mass of the molecule.

The abbreviation "pci" refers to pounds per cubic inch.

"Pigment" means a dry insoluble substance which imparts color when dispersed or suspended in a liquid vehicle.

"Polyols" are alcohols containing multiple hydroxyl groups, in particular polyether diols.

The abbreviation "psi" refers to pounds per square inch.

As used herein, the term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Mine Seal Adhesive
NCO-Functional Component

The portion of a polyurethane or polyurea precursor comprising NCO functionalities is commonly referred to as the "A-side." In the present composition, the A-side can be chosen from a variety of compounds having NCO groups. Preferably, the A side comprises a polyisocyanate. The polyisocyanate can comprise an aromatic isocyanate such as diphenylmethane diisocyanate (MDI) or toluene diisocyanate (TDI), and/or an aliphatic isocyanate such as hexamethylene diisocyanate (HDI) or isophorone diisocyanate (IPDI). MDI materials include 2,2'-MDI, 2,4'-MDI, and 4,4'-MDI. A preferred aliphatic isocyanate is HDI, such as an HDI marketed by Bayer Material Science LLC, Pittsburgh, Pa. under the trade name DESMODUR [including DESMODUR N-3800 (having an NCO content of 11%±0.5%), DESMODUR 3200 (having an NCO content of 23%±0.5%), DESMODUR N-75 (having an NCO content of 16.5%±0.3%), and DESMODUR N-100 (having an NCO content of 22%)].

In forming the A-side of the present materials, desired characteristics can be imparted to the final material by forming prepolymer mixtures of an isocyanate and another material. In order to better withstand the stress of compressive force which a mine seal may experience, such as during a mine explosion, a material which imparts elastomeric properties to the present polymer materials is preferably used. A preferred prepolymer is formed by reacting an aromatic isocyanate with an alcohol-containing compound, such as ethylene glycol or glycerin. Preferably the alcohol-containing compound is a polyol, for example polyethylene glycol or polypropylene glycol. The polyol is preferably a polyether polyol with a molecular weight of between 1000 and 3000, and more preferably of about 2000.

In a preferred embodiment, the A-side of the present composition is a blend of aromatic and aliphatic polyisocyanate materials. For example, the A-side can be formed by first combining an aromatic isocyanate such as 2,4' MDI with an alcohol-containing molecule such as a polyol in order to form a first prepolymer. Preferably, the MDI material has an NCO content of at least 10% by weight, more preferably 15%-20% by weight, even more preferably 25% by weight, and yet more preferably has an NCO content of at least 33% or 35%. The isocyanate of the first prepolymer composition preferably has an NCO content of between 15% and 33%, and more preferably between 16% and 18%. In one embodiment, the first prepolymer comprises between 50% and 60% by weight MDI and between 40% and 50% by weight polyol.

After thorough mixing of these components, they are allowed to react, such as for between 12 and 24 hours at room temperature. Once these components have substantially completely reacted, a second prepolymer can be formed by mixing the first prepolymer with an aliphatic isocyanate having an NCO content of between 8% and 24%, such as HDI. For example, an HDI material such as DESMODUR N-3800 (having an NCO content of 11%) can be used. The first prepolymer and aliphatic isocyanate are preferably allowed to react for between 12 and 24 hours at room temperature, thereby forming the A-side of the present composition. In forming the second prepolymer, the first prepolymer and aliphatic isocyanate such as HDI are preferably mixed in a 50:50 ratio by weight, although ratios of first prepolymer:aliphatic isocyanate of between 20:80 and 80:20 can be used. The aliphatic isocyanate of the second prepolymer preferably has an NCO content of between 8% and 17%, and more preferably between 12% and 15%. The final A-side composition preferably has a viscosity of between 1,000 and 3,000 centipoise at 80° F., and more preferably has a viscosity of about 2,000 centipoise.

Amine-Functional Component

The blend of amines and/or polyols and other additives of a polyurethane or polyurea precursor is commonly referred to as the "B-side." The present polymer composition is preferably a polyurea, and is therefore preferably formed by a B-side comprising an amine functional resin (polymer precursor), such as a secondary amine. Polyureas are preferred for use in creating the present mine seals 10 because the seals are often formed in a moist environment, and when urethanes are exposed to water, carbon dioxide is generated, causing foaming of the composition which can reduce its strength. Polyurethanes are also less preferred because the reaction forming a polyurethane can involve the generation of heat, which can be dangerous in the environment of an underground mines, where fire and explosions are a danger. A variety of amine functional resins can be used to form the B-side of the present composition, preferably an aminofunctional reactive resin such as JEFFAMINE polyoxyalkyleneamines such as JEFFAMINE T-3000 (available from Huntsman Performance Products, The Woodlands, Tex.). In a preferred embodiment, the amine functional resin is DESMOPHEN NH 1420 (available from Bayer Material Science LLC, Pittsburgh, Pa.) or The B-side preferably comprises 95% by weight of an amine-functional resin. The amine functional resin preferably has 2 or 3 amine functional groups per molecule, and also preferably has an amine equivalent weight of between 200 and 350, and more preferably of about 300. The amine equivalent weight is the molecular weight of the amine component divided by the number of active hydrogens in the molecule, as is known to the art.

Other components are also preferably included in the B-side in order to impart desired characteristics to the present polymer composition. For example, a plasticizer such as propylenecarbonate S (available from BASF Corporation) can be used in order to impart desirable flow characteristics to the present composition and allow it to flow into the pores of porous surfaces, such as concrete surfaces. An air release agent such as DISPARLON OX-60 (available from King Industries, Norwalk, Conn.) is also preferably included in order to allow air trapped underneath a layer of the present composition to be released into the atmosphere, thereby allowing the present composition to better contact and adhere to the applied surface. The final B-side composition preferably has a viscosity of between 500 and 1,000 centipoise at 80° F., and more preferably has a viscosity of about 750 centipoise, and is a castable composition (prior to curing).

Water Scavengers

The present composition also preferably includes a water scavenger, such as a molecular sieve. Water scavengers can be included in the A-side and/or the B-side of the precursors of the present composition, but are preferably included in at least the B-side. Water scavengers are believed to be useful in the present composition in order to remove water from both the B-side composition as well as from the combined A-side and B-side reaction mixture. Water accelerates the reaction of the A-side and B-side components, and such acceleration can be disadvantageous when creating a flowable, castable mixture, in particular for use in creating a structure such as a mine seal, in view of the need for a period of time to allow the construction of a mine seal, and at a minimum sufficient time to allow a structural component to be placed into contact with a surface on which the reaction mixture has been applied, e.g. sufficient time to allow the adhesive to be applied to the surface of a block and then place such adhesive in contact with another block which is to be adhered, prior to curing. The use of a water scavenger in the present composition thus contributes to a longer pot life for the present polyurea materials. Examples of water scavengers include silanes (e.g., vinyltrimethoxysilane) and sulfonyl isocyanates (e.g., para-toluenesulfonyl isocyanate).

A particularly preferred water scavenger for use in the present composition is a molecular sieve. Without being limited to a particular mechanism of action, molecular sieves in the present composition are believed to facilitate wicking of water from a surface to which the present composition is applied, such as a concrete surface, to the surface of the polymer, thereby allowing polyols in the present composition to better penetrate the spaces formerly occupied by such water and provide a better adhesion to the concrete. Any water transferred to the surface of the present composition would also accelerate somewhat the reaction of the material at the surface, helping it to cure faster once applied to a surface.

Molecular sieves useful in the present composition comprise pores which allow water molecules to pass through the pores while excluding larger molecules, which tends to wick water molecules into the molecular sieve material and retain them there. Molecular sieves preferably can adsorb up to 20% or more of their own weight in water. Examples of molecular sieves include aluminosilicate minerals, clays, porous glasses, microporous charcoals, zeolites (such as L-powder, available from UOP LLC, Des Plaines, Ill.), and active carbons. Molecular sieves preferably have a relatively uniform pore size of about 0.4 nm. When used in the present composition, molecular sieves are included in an amount of between about 0.1% and 5% by (anhydrous) weight of the B-side of the composition.

Colorant

In a preferred embodiment, the present materials include a colorant. The use of a colorant in either the A-side or the B-side of the present composition, or in another composition formed from two or more prepolymers, such as polyurethane, can provide a visual indicator of the amount of mixing of the A-side and B-side of the present composition. Sufficiently mixed compositions will have a uniform coloration, while insufficiently mixed compositions may appear "marbled" or streaked, indicating that more of one precursor material is present than the other in such streaked areas. If the proportions of the A-side and B-side are incorrect, the use of colorants can also provide a visual indicator of this. Insufficiently mixed materials or materials mixed in the wrong proportions may be weaker or have other suboptimal properties, and may therefore even fail to meet the predetermined requirements for a mine seal 10, so providing a visual indicator of the proper mixing of the A-side and B-side components can be an important quality control measure.

Preferably, one of either the A-side or B-side material is colored so as to comprise a visually distinguishable color, while the other component (either A-side or B-side) either is not colored or is colored so as to comprise a color which has a wavelength that is at least 20 nanometers different than the color of the other colored component (and is also visually distinguishable by a human). More preferably the wavelengths of the colorants used in the A-side and B-side are different by at least 30 nm, and more preferably by at least 40 nm.

The addition of a colorant to one of the precursor materials (i.e. the A-side or B-side) allows a user of the present materials to determine in real time whether an appropriate amount of each component is being combined. If the mixture of the A-side and B-side is a darker or lighter color than is intended or expected, this may indicate that the mixture does not contain the correct proportion of A-side and B-side materials. Without a real-time indicator of the mixing status of the present materials, an individual producing the present materials may not be able to determine whether there is a problem with the mixing of the materials, and may only become apprised of a problem after the mine seal 10 fails post-construction testing for strength and other parameters. When the present polymer materials are being mixed and applied by individuals in a mine who do not specialize in the creation of mine seals but only create them periodically as needed, the use of a real-time indicator of the mixing status of the precursor components of the present composition can be important.

Preferably, an individual involved in creating the present mine seal 10, such as an individual mixing and/or applying the A-side and B-side of the present composition, is provided with a colored substrate with which to compare the mixed A-side and B-side materials. The colored substrate can include one or more colors corresponding to a mixed A-side and B-side composition that will result in a cured material that creates a mine seal 10 that is sufficiently strong and has other advantageous properties. After the A-side and B-side materials are applied to a surface of a mine seal 10 under construction, and before such mixed materials have cured, such an individual can compare the color of the colored substrate to the color of the mixed A-side and B-side materials and determine whether there is a match, in which case construction of the mine seal 10 can continue. The colored substrate can, for example, comprise a piece of colored cardboard, paper or other material. In one embodiment, the colored substrate can comprise a packaging material associated with the A-side or B-side components of the present composition, such as a plastic bag having the appropriate color printed thereon.

In one embodiment, a colored substrate can also be provided which includes one or more colors that correspond to insufficiently or incorrectly mixed A-side and B-side materials, so that an individual building the present mine seal 10 can compare the mixed A-side and B-side materials to such a colored substrate and better determine whether the mixed composition will result in a sufficiently strong mine seal 10. If the mixed and applied A-side and B-side materials do not match the appropriately colored substrate, and/or if they match the colored substrate showing suboptimal mixing, then the applied A-side and B-side materials are preferably removed from the surface to which they are applied. The surface can then be cleaned, if appropriate, and appropriately mixed A-side and B-side materials can then be applied to it. Alternatively, the blocks to which suboptimally mixed polymer precursors were applied can be removed.

Although a pigment can be used as a colorant in the present compositions, the colorant used in the present composition is preferably a dye, such as an organic dye, which mixes homogeneously with either the A-side or B-side and is compatible with the other components of the respective precursor composition. The colorant is also preferably in liquid form, i.e. is a uniform/homogenous free pouring liquid.

When the colorant is added to the B-side, it is preferably amino and/or hydroxy terminated, such as a polyol, in order to be able to react with isocyanate. Preferably, it also has a low viscosity, i.e. <5000 cps. One such colorant is sold under the trade name REACTINT (available from Milliken Chemical, Spartanburg, S.C.), which is a reactive polymeric colorant that consist of chromophores which are chemically bound to polyols. Dyes preferably make up a minor portion of the present composition, such as less than about 0.1% by weight.

Mine Seals and Other Structures

The present adhesive is useful in creating any of a number of structures, including walls, buildings, and other structures in which component parts are adhered using the present adhesive composition. Such component parts are preferably made from a porous material, such as concrete, in order for the adhesive to better adhere to such components. In a preferred embodiment, the present adhesive composition is used to construct a mine seal. In preferred embodiments, the present adhesive is used in underground mining applications, such as mine stops and mine seals.

The present mine seals 10 are typically formed from rigid, heavy construction materials such as CMU (concrete masonry unit) blocks, although other materials such as HYBRICRETE polymer blocks (available from MICON, Inc., Glassport, Pa.) can also be used. CMU blocks for example have a compressive strength of about 2500 psi and are generally 3-4 inches×4 inches×8 inches in size. Such blocks 20 or other structural components can be joined to form mine seals 10 in a variety of sizes and dimensions, depending on the size and dimension of a particular shaft or other tunnel being sealed. Typically mine seals 10 are about 26 feet wide and range in height from about 5 feet to 13 feet, with a thickness of from about 18 inches to 56 inches. Typical dimensions are set out below in Table 1.

TABLE 1

Typical Mine Seal Dimensions

| Height (ft) | Width (ft) | Thickness (in) | Length in Blocks (Floor only) | Length in Blocks (Floor and Ribs) |
|---|---|---|---|---|
| 5 | 26 | 32 | 11 | 9 |
| 6 | 26 | 40 | 12 | 10 |
| 7 | 26 | 48 | 13 | 11 |
| 8 | 26 | 56 | 15 | 13 |
| 9 | 26 | 64 | 17 | 14 |
| 10 | 26 | 18 | | 15 |
| 11 | 26 | 20 | | 16 |
| 12 | 26 | 22 | | 18 |
| 13 | 26 | 24 | | 19 |

When constructing the present mine seal 10, debris is preferably removed 50-ft inby (away from the mine entrance and toward the working face) and outby (toward the mine entrance and toward the working face) the mine seal 10 location. Loose material is preferably removed 3 feet from the inby and outby sides of the mine seal 10, including loose ribs, roof, and floor. If soft floor or fireclay is encountered, it is also preferably removed down to competent rock. If soft material is unable to be removed, an alternative seal location should be used. Ground conditions to be avoided include faults, cutters, floor heave, and rib damage. If floor heave is encountered, it should likewise be removed down to competent floor before building the mine seal 10.

Hitching may be required depending on the surrounding strata. If this is the case, the mine seal 10 should be hitched into the competent strata of the floor. The hitch is preferably at least 8 inches deep and the thickness of the mine seal 10. The space between the block and the hitch is preferably filled with the present adhesive material 40. In one embodiment, a concrete pad is first created across the floor of a mine shaft prior to building a mine seal wall on top of the pad.

The mine seal 10 preferably uses perimeter friction to anchor it in place. If material friction is used as an anchoring method, the ribs 30, roof 32, and floor 34 preferably have a roughness of 0.5 inches in 4 feet. This can be accomplished by manual or mechanical means. To minimize air leakage, the mine seal 10 is preferably located not less than 5 feet from the corner of any pillar. If the mine seal 10 is to be located less than 10 feet from the corner of a pillar, the ribs 30 are preferably reinforced with gunnite or shotcrete. If this occurs on the inby side of the mine seal 10, this is preferably done prior to seal installation.

The mine seal construction site should be free of standing or flowing water during the mine seal 10 construction. Standing water should be pumped from the mine seal location, and flowing water should be routed around the mine seal location, such as through pipes, or stopped by grouting of the wet strata.

For safety reasons, there should also be no conductive material passing through the mine seal 10. All straps, screens, and other conductive materials are therefore preferably completely removed from the area.

Figure 5:
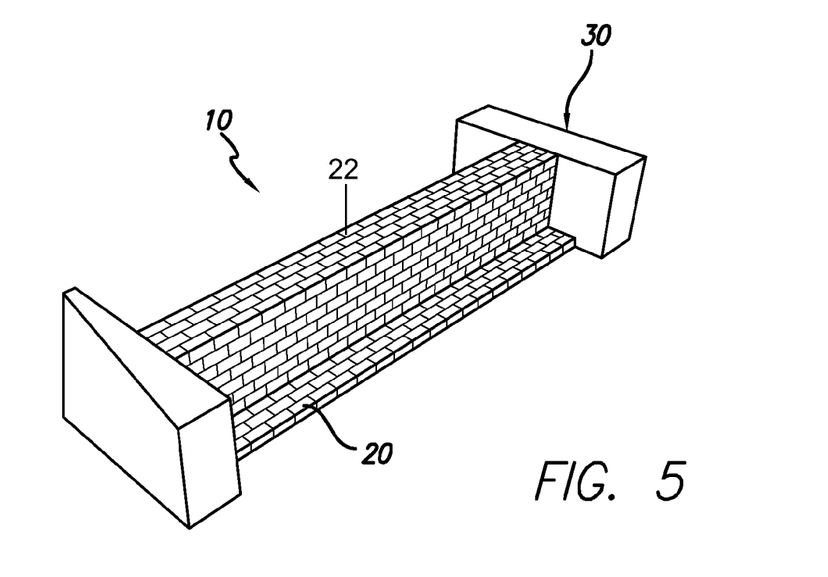
FIG. 5 is a perspective view of an embodiment of the present mine seal.
Figure 6:
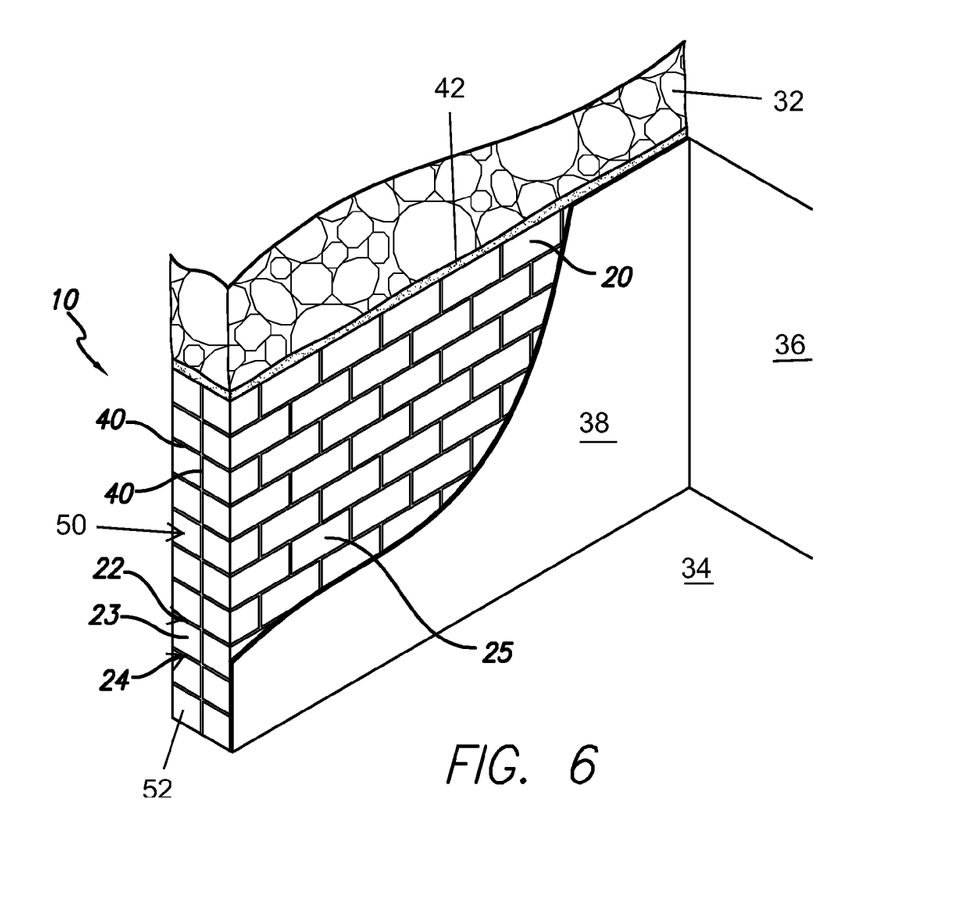
FIG. 6 is a cutaway perspective view of another embodiment of the present mine seal.

When positioning blocks to form a mine seal 10, they are preferably placed end to end across a tunnel opening to be sealed, as shown in the embodiment of FIGS. 5 and 6. The present adhesive material 40 preferably coats the top face 22, bottom face and both lateral ends 23 of a block 20 of the present mine seal, in order to seal the block 20 to adjacent blocks and/or to the ground, a wall, or a ceiling portion of a tunnel being sealed. In addition, each side face 25 of a block 20 which faces a side face of another block 20 is preferably coated with the present adhesive material 40 in order to adhere the two adjacent blocks 20.

Following construction of the block wall portion of the mine seal 10, the polymer adhesive 40 described herein can be used to adhere the perimeter 50 of the mine seal 10 to the mine roof 32 and walls 36 adjacent to and/or in contact with the outer facing surfaces 52 of the perimeter 50 of the mine seal 10. In most cases, it is expected that there will be gaps and/or voids between such outer facing surfaces 52 and the walls 36 and roof 32 of a mine, since the shape of such outer surfaces 52 (generally flat) will not necessarily match the contour of the mine roof 32 and walls 36. In order to seal the inby side of the mine seal from the outby side, a polymer material is preferably used to fill such voids and gaps. In one embodiment, the polymer material can be an adhesive such as that described herein. However, in a preferred embodiment the material used to seal the perimeter of the mine seal 10 is a foaming polymer 42, such as a polyurethane foam. Sealing of the mine seal 10 to the surfaces of the mine roof 62 and walls 36 is important both to prevent the transmission of gases from one side of the mine seal to the other, but also to provide additional strength and blast resistance to the mine seal 10.

When polyurethane is used to seal the perimeter of a mine seal, the foam 42 is preferably a polyurethane foam having a density of at least about 12 pounds per cubic inch (pci). Foams of this density have sufficient sheer strength to contribute to the blast resistance of the mine seal 10. Preferably, the foam is about 15 pci, although higher densities, such as 20 pci, 25 pci, 35 pci, 45 pci, or up to about 60 pci can also be used. The foam 42 should preferably have sufficient sheer strength to contribute to the blast resistance of the present mine seal 10 while still foaming sufficiently to fill gaps and voids between the mine seal 10 and the roof 32 and walls 36 of a mine.

Preferably, the foam 42 comprises a sucrose amine based polyol and a polysiloxane surfactant group. The foam 42 also preferably comprises a propylene carbonate in order to reduce the viscosity of the polyol. In order to ensure good mixing of the precursor components of the foam 42 and also establish a relatively uniform cellular structure in the resulting foam (to avoid weak points within the foam structure), it is also preferred that air be injected as the foam 42 is applied. In addition, the isocyanate components of both the foam and the present adhesive are preferably prepared with an index, i.e. a ratio of the A-side to B-side, of 1.1 to 1.3, since the NCO content of the precursor materials tends to decrease over time as such materials are stored.

In order to ensure a secure bond between such foam 42 and both the mine seal 10 and the roof 32 and walls 36 of a mine, the perimeter of the mine seal 10 as well as the roof 32 and wall 36 surfaces adjacent the perimeter 50 of the mine seal 10 are preferably coated with a layer of the adhesive 40 used to form the present mine seal 10, and/or with another polymer material able to penetrate into and/or bond with the blocks of the mine seal 10 as well as the material forming the surface of the mine roof 32 and walls 36 (usually rock). In this way, the foaming polymer can be securely bound to both the mine seal 10 and the adjacent surfaces of the mine shaft. In a preferred embodiment, the adhesive described herein is coated onto both the mine seal perimeter as well as onto the adjacent surfaces of the roof 32 and walls 36 of the mine.

In addition to sealing the perimeter of the mine seal 10, the remaining outer facing surfaces of the mine seal 10, namely the inby wall face and/or the outby wall face, can also be covered with a polymer material 38 such as a polyurethane or polyurea in order to seal these faces and slow or prevent the passage of gases through pores in the blocks used to form the block wall of the mine seal 10. In a preferred embodiment, such as that shown in FIG. 6, the present mine seal 10 comprises a wall which is at least two blocks in depth and/or comprises at least two parallel concrete block walls 36. More preferably the mine seal is at least three or four blocks in depth. Since the faces of the blocks that are adhered to each other are generally covered with a layer of adhesive material 40, the adhesive used to form the present mine seal 10 will itself already serve to impede the passage of gases between the inby and outby sides of the mine seal. However, an additional layer of polymer material covering the surface of the inby wall face and/or the outby wall face can be applied in order to better seal the mine seal 10.

Polymer Application

In underground mining applications, it is important for safety reasons that the use of electrically operated equipment be avoided, in order to avoid sparking fires due to the presence of combustible gases in underground mines (an electric motor could provide a spark that ignites such gases). In order to mix the A-side and B-side components when constructing a mine seal 10, a pneumatic pump is therefore preferably used. A pneumatic pump is preferred because air pressure can be supplied to the pump through an air hose, enabling the pump to operate underground without electricity.

A pneumatic adhesive dispensing system 100 that can be used in creating underground mine seals is illustrated in FIGS. 1-4. The system 100 is supported by a support structure, which in the illustrated embodiment is in the form of a "cage" 110 containing the components of the dispensing system 100. The cage 110 comprises vertical side bars 112 located at least at each corner of the cage 110 which extend upwardly from a support surface 111. The vertical side bars 112 are attached to horizontal side bars 114 in order to provide structural support for the cage 110 and other components of the system 100. The cage 110 and its component parts are preferably made from a rigid material such as steel in order to allow the system 100 to be moved to a location at which it will be used, such as the site of construction of a new mine seal 10. The cage 112 can be moved for example by a payloader. The vertical side bars 112 preferably extend no more than about 48 inches from the support surface 111 in order to facilitate passage of the system 100 through the confines of an underground mine.

Also attached to the support surface 111 in the illustrated embodiment is a central vertical support bar 115, to which other components of the system are attached. Preferably, such other components are not attached to the vertical side bars 112 or horizontal side bars 114, and the vertical side bars 112 and side bars 114 are preferably removable from the support surface 111 so that other components of the present system 100 can be accessed for maintenance or repair.

Figure 1:
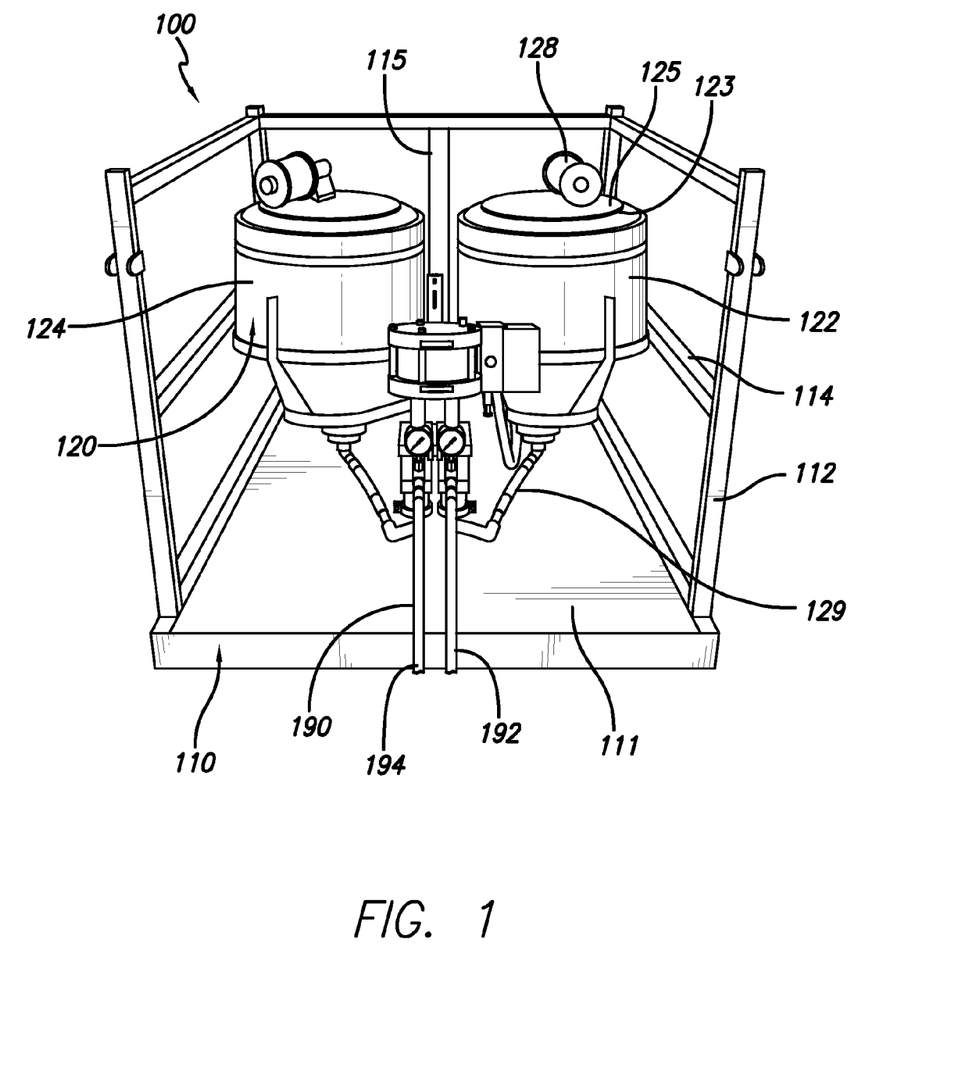
FIG. 1 is a perspective view of the front of an adhesive dispensing system for use in underground mining applications.

As illustrated in FIG. 1, the dispensing system 100 further comprises two material containers 120, an A-side container 122 for holding the A-side material and a B-side container 124 for holding the B-side material. Each of the containers 120 comprises a closeable opening 123 at an upper end and a lid 125 which closes and preferably seals the opening 123 when the containers 120 hold the A-side or B-side material. In the illustrated embodiment, a desiccant housing 128 which communicates with the interior of the container 120 is provided on each of the lids 125. A desiccant material contained in the desiccant housing 128 helps to keep materials contained within the containers 120 from becoming contaminated with environmental moisture. At their lower ends, the containers 120 comprise outlets that are attached to hoses 129, which convey the A-side or B-side material to a proportioner pump 160.

Figure 2:
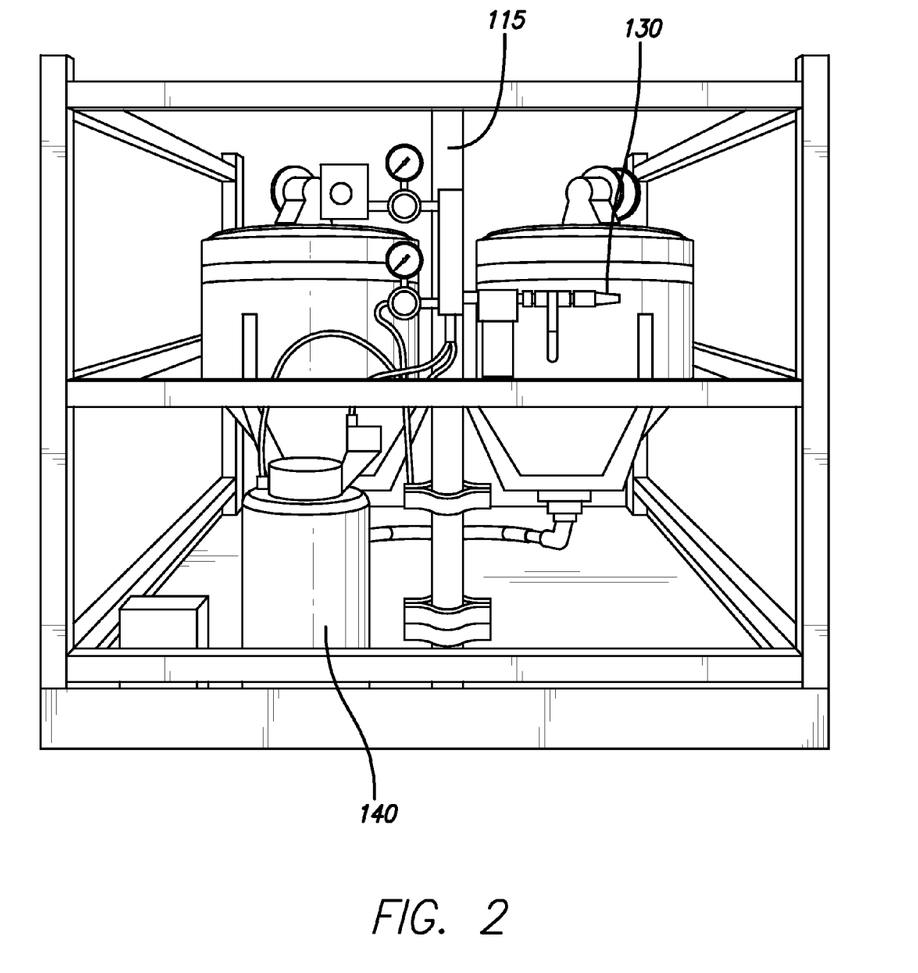
FIG. 2 is a perspective view of the rear of the adhesive dispensing system shown in FIG. 1.

FIG. 2 illustrates the rear of the dispensing system 100, showing a pressure hose connector 130 for connection to a source of pneumatic pressure. Also illustrated is a solvent container 140 for retaining a solvent, which can be used to clean components of the present system 100 that come into contact with the A-side and/or B-side components, such as the applicator 200 (shown in FIG. 4).

Figure 3:
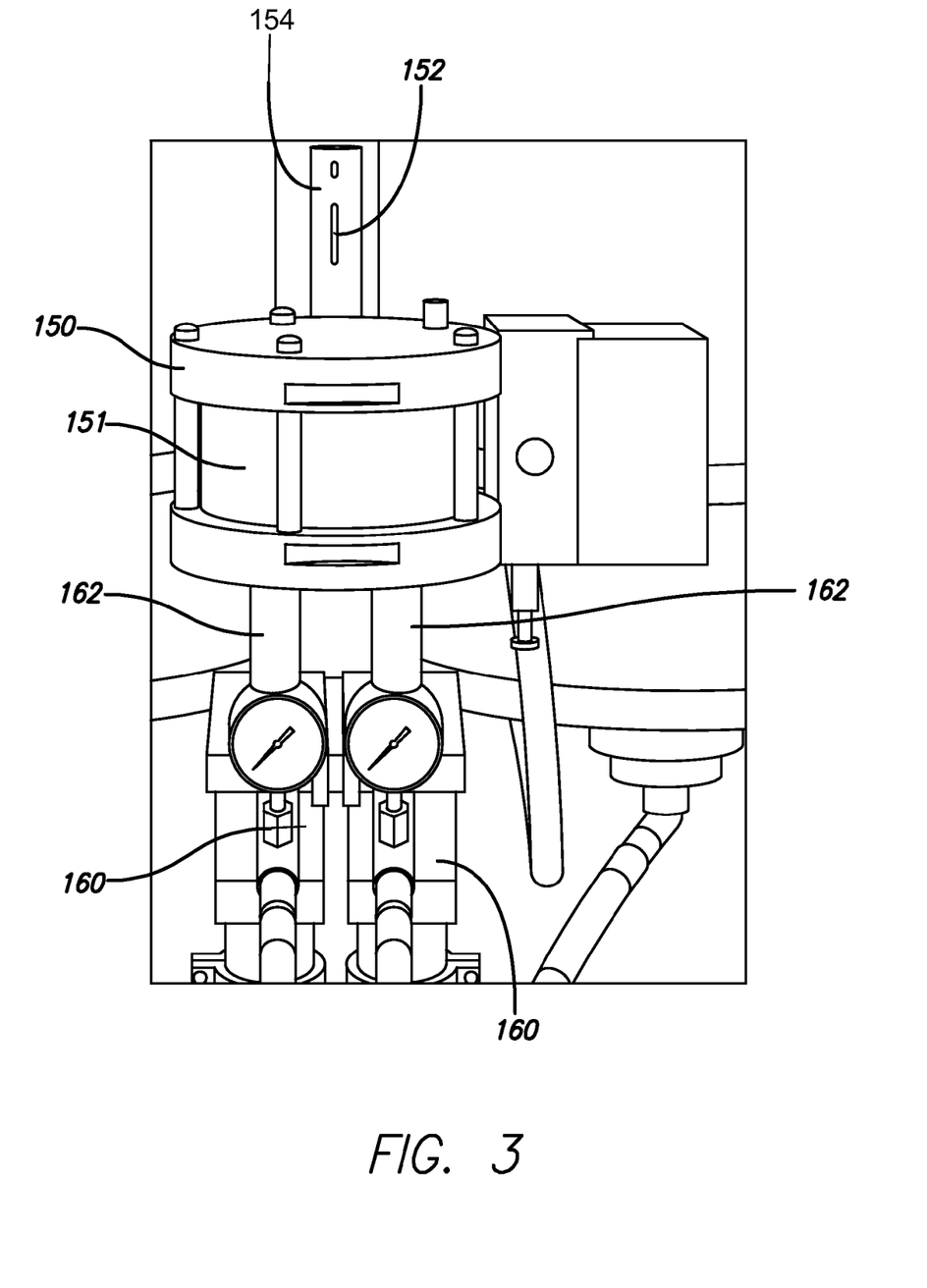
FIG. 3 is a perspective view of the pumps used in the adhesive dispensing system shown in FIG. 1.

The pressure hose connector 130 is connected by a hose or conduit to a pneumatic pump 150, best seen in FIG. 3. The pneumatic pump 150 draws a metered quantity of the A-side and B-side materials from the containers 120, and propels them through discharge conduits 190 to an applicator 200, where the components mix and from which the components are then delivered to the mine seal structural components.

Pneumatic pumps operate using a piston which alternates between suction and discharge strokes. At the point that the piston finishes a stroke and begins the next portion of the cycle, such pumps sometimes experience a pressure drop or fluctuation. Such pressure changes can potentially lead to a change in the relative amounts of the A-side and B-side components pumped by a device or in the amount of mixing of such components. In order to avoid such changes, the present system 100 can include an accumulator in communication with each of the A-side and B-side discharge conduits 190. The accumulator can be a closed, air-filled container which is in communication with one of the A-side and B-side discharge conduits. The air or other gas contained in the container of the accumulator applies pressure to the A-side or B-side component flowing through a conduit if the pump pressure drops or fluctuates, thereby ameliorating such pressure change.

Another alternative for controlling the rate at which each of the A-side and B-side components are dispensed through the discharge conduits 190 is through the use of proportioner pumps 160, shown in FIG. 3. Pneumatic and proportioner pumps are available, for example, from Magnum Venus Plastech (5148 113th Ave. N., Clearwater, Fla. 33760).

In use, the pump rod 152 of the pneumatic pump 150 illustrated in FIG. 3 moves vertically upward and downward as it cycles between suction and discharge strokes. The pneumatic pump rod 152 is mechanically attached to a proportioner pump rod (within housing 162) associated with each of the proportioner pumps 160, which cycle with the pneumatic pump rod 152. A seal between the proportioner pump rods 162 and the opening through which they pass into the proportioner pumps 160 serves to keep moisture and other contaminants from entering the stream of A-side or B-side material passing through the proportioner pumps 160.

As can be seen in FIG. 3, the pneumatic pump rod 152 extends upwardly into a pneumatic pump rod housing 154. In the illustrated embodiment, the pump rod 152 maintains a uniform area within the pneumatic pump housing 151 during both the up and down strokes of the pneumatic pump 150, thereby reducing variances in the output pressure of the pump 150. In order to maintain such a uniform area within the housing 151 of the pneumatic pump 150, the pump rod 152 is sufficiently long to extend all the way through the interior of the housing 151 during the downward stroke of the pump 150. During the upward stroke of the pump, the pump rod 152 extends outside the housing 151 of the pneumatic pump 150 and into a pump rod housing 154.

Figure 4:
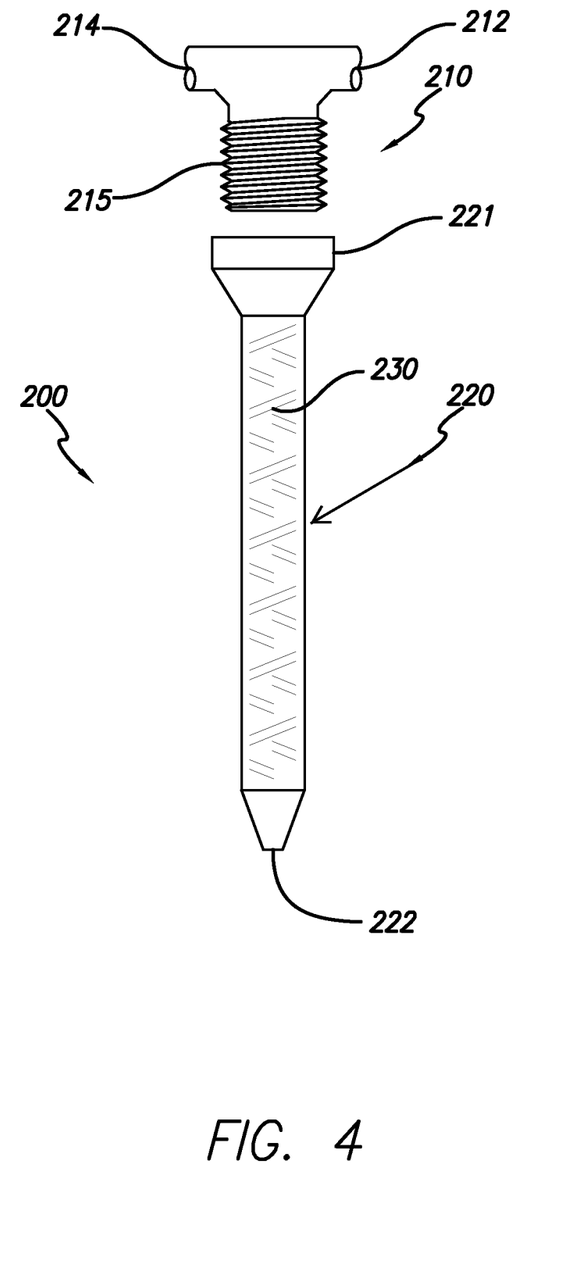
FIG. 4 is a side view of a static mixer for use with the adhesive dispensing system shown in FIG. 1.

The A-side and B-side components of the present adhesive polymer composition are discharged through respective discharge conduits 190 and mixed in an applicator 200 just prior to being dispensed. Due to the viscosity of the A-side and B-side components, the mixture exits the applicator as a flowable or castable material. FIG. 4 illustrates one embodiment of an applicator 200, showing a connector 210 which comprises a first conduit 212 in liquid communication with the A-side discharge conduit 192 and a second conduit 214 which is in liquid communication with the B-side discharge conduit 194. The A-side and B-side materials come into contact within a receiving compartment within the connector 210.

The connector 210 is fitted into the proximal end 221 of a static mixer 220 by means of a threaded connection 215, though other connections are possible. The static mixer assures proper mixing of the A-side and B-side materials, although such mixing can also be accomplished in other ways known to the art. In the illustrated embodiment, the applicator 200 comprises a spiral mixing element 230 within the longitudinal extent of the static mixer 220, thereby providing a tortuous path through which the A-side and B-side materials must pass before exiting the distal end 222 of the applicator 200. Static mixers are available from a number of suppliers, such as Tamarron Technology Inc. (1660 E. Tamarron Ct., Springboro, Ohio 45066).

Once the mixed polymer materials exit the distal end 222 of the applicator 200, the mixed material is applied to the surface of a block which is to be joined either to another block or to the surface of a wall, floor, rib or ceiling of a tunnel. The present polymer material preferably remains in a liquid or semi-liquid state for approximately 15 minutes, in order to allow sufficient time for workers to apply the uncured polymer to a surface and then place the coated surface in contact with another structural element with which it is to be joined before the polymer becomes sufficiently reacted that it becomes difficult for a user to reposition the structural elements. The polymer also preferably cures within about 24 to 48 hours following application.

Depending on the nature of the strata surrounding a seal, additional polymer material can be applied around the outer edges of a mine seal 10 in order to seal the mine seal 10 to the surrounding strata of the tunnel. The polymer can be a polyurea material as described herein, or alternatively can be a polyurethane material, such as a polyurethane foam.

EXAMPLES

Example 1

Polymer Formation

The A-side of the present polymer composition is prepared as follows. A first prepolymer is prepared by mixing LUPRANATE MDI (56.76% by weight, available from BASF Corporation, Florham Park, N.J.) and POLY-G 20-56 polyol (43.24% by weight, available from Arch Chemicals, Inc., Norwalk, Conn.) and then blending these components for 2 hours. After allowing this mixture to react overnight, a second prepolymer is prepared by adding an HDI material such as DESMODUR N-3800 to the first prepolymer to form a 50:50 mixture by weight of the first prepolymer and the HDI material. This mixture is blended for 2 hours and then also allowed to react overnight.

The B-side is prepared by mixing the following components in the order and amount shown in Table 1 below.

TABLE 1

| Components | wt % |
|---|---|
| Amine functional resin | 95.000 |
| Propylenecarbonate S | 3.726 |
| DISPARLON OX-60 | 0.200 |
| UOP L-Power | 1.000 |
| Colorant | 0.074 |

Example 2

Material Strength Testing

The A-side and B-side compositions described above in Example 1 were mixed and applied as a liquid to concrete blocks and allowed to cure, thereby joining the blocks. Three blocks approximately 2¼ inches×3¾ inches×7¾ inches were joined end-to-end in this way and were tested for flexural strength using a Simple Beam with Center-Point Loading test according to ASTM C293.

The results of tests on 3 specimens are shown below in Table 2. Each specimen was formed from the same material, but was subjected to different amounts of mixing. Specimen 1A was subjected to a shorter duration of mixing of the A-side and B-side components, while specimens 1B and 1C were more thoroughly mixed.

TABLE 2

| Specimen Number: | 1A | 1B | 1C |
|---|---|---|---|
| Width, Inches: | 2.30 | 2.30 | 2.30 |
| Depth, Inches: | 3.80 | 3.80 | 3.80 |
| Span, Inches: | 18 | 18 | 18 |
| Maximum Load, lbs.: | 570 | 1000 | 780 |
| Flexural Strength, psi: | 465 | 815 | 635 |

As can be seen from Table 2, specimen 1A exhibited less flexural strength than specimens 1B and 1C. However, all specimens were found to exhibit strengths of greater than 400 psi, showing that even when mixed under suboptimal conditions the present material provides significantly greater strength to a mine seal as compared to cement mortar.

Moreover, when specimens 1B and 1C failed (reached their maximum load), the portion of the assemblage that broke was the concrete portion, meaning that the polymer material binding the concrete blocks had a higher load capacity than the concrete itself.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference in their entirety.

What is claimed is:

1. A mine seal comprising a wall of rigid blocks and an adhesive composition, wherein the rigid blocks are adhered to each other using the adhesive composition, the wall comprising an upper surface adjacent a roof of a mine shaft and two sides, each side of the wall being adjacent to a vertical wall portion of the mine shaft, wherein the adhesive composition is formed by:
   providing an aromatic isocyanate with an NCO content of between 15% and 35% by weight;
   preparing a first prepolymer by mixing the aromatic isocyanate and a polyol;
   providing an aliphatic isocyanate with an NCO content of between 8% and 24% by weight;
   preparing a second prepolymer by mixing the first prepolymer with the aliphatic isocyanate;
   providing an amine functional resin comprising a secondary amine;
   mixing the second prepolymer and the amine-functional resin to form a castable adhesive composition.

2. The mine seal of claim 1, wherein the blocks are porous.

3. The mine seal of claim 2 wherein the blocks are concrete masonry unit blocks.

4. The mine seal of claim 1, wherein a polymer foam is applied between the roof of the mine shaft and the upper surface of the wall of the mine seal, and between the sides of the wall and the respective vertical wall portions of the mine shaft.

5. The mine seal of claim 4, wherein the adhesive composition is applied to the roof of the mine shaft, the upper surface of the wall of the mine seal, the vertical sides of the wall, and the respective vertical wall portions of the mine shaft before the polymer foam is applied.

6. The mine seal of claim 4, wherein the polymer foam is a polyurethane foam having a flexural strength ranging from 465 to 815 pounds per square inch.

7. The mine seal of claim 1, wherein the isocyanate of the first prepolymer has an NCO content of between 16% and 18% by weight.

8. The mine seal of claim 1, wherein the isocyanate of the first prepolymer is selected from the group consisting of diphenylmethane diisocyanate (MDI), toluene diisocyanate (TDI), and hexamethylene diisocyanate (HDI).

9. The mine seal of claim 1, wherein the isocyanate of the first prepolymer is MDI and comprises between 50% and 60% by weight of the first prepolymer.

10. The mine seal of claim 1, wherein the polyol comprises between 40% and 50% by weight of the first prepolymer.

11. The mine seal of claim 1, wherein the first prepolymer and the aliphatic isocyanate form a 50:50 mixture by weight.

12. The mine seal of claim 1, wherein the aliphatic isocyanate of the second prepolymer has an NCO content of between 12% and 15% by weight.

13. The mine seal of claim 1, wherein the aliphatic isocyanate of the second prepolymer is HDI.

14. The mine seal of claim 1, further comprising the step of adding a water scavenger to the amine functional resin.

15. The mine seal of claim 14, wherein the water scavenger is a molecular sieve.

16. The mine seal of claim 15, wherein the molecular sieve comprises between 0.1% and 5% by weight of the amine functional resin.

17. The mine seal of claim 1, further comprising a colorant, wherein the colorant is added to either the secondary prepolymer or to the amine functional resin.

18. The mine seal of claim 17, wherein the colorant is an organic dye.

19. The mine seal of claim 1, wherein a first colorant is added to the second prepolymer and a second colorant added to the amine functional resin, wherein the resulting colors of the second prepolymer and the amine functional resin have wavelengths which differ by at least 20 nanometers.

20. The mine seal of claim 1, wherein the amine functional resin is mixed with a further component selected from the group consisting of a plasticizer and an air release agent prior to mixing the amine functional resin with the second prepolymer.

\* \* \* \* \*